US009527199B2

(12) United States Patent
Massler et al.

(10) Patent No.: US 9,527,199 B2
(45) Date of Patent: Dec. 27, 2016

(54) CHISELING POWER TOOL

(71) Applicant: Hilti Aktiengesellschaft, Schaan (LI)

(72) Inventors: Orlaw Massler, Triesenberg (LI); Josef Fuenfer, Koenigsbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 451 days.

(21) Appl. No.: 13/900,405

(22) Filed: May 22, 2013

(65) Prior Publication Data

US 2013/0319712 A1 Dec. 5, 2013

(30) Foreign Application Priority Data

May 29, 2012 (DE) ........................ 10 2012 208 986

(51) Int. Cl.

| | |
|---|---|
| ***B23B 45/16*** | (2006.01) |
| ***B25D 9/00*** | (2006.01) |
| ***B25D 13/00*** | (2006.01) |
| ***B25D 11/00*** | (2006.01) |
| ***B25D 16/00*** | (2006.01) |
| ***B25D 11/06*** | (2006.01) |
| ***B25D 17/06*** | (2006.01) |

(52) U.S. Cl.

CPC ............... *B25D 11/06* (2013.01); *B25D 17/06* (2013.01); *B25D 2217/0019* (2013.01); *B25D 2250/185* (2013.01)

(58) Field of Classification Search

CPC . B23B 45/00; B25D 17/06; B25D 2217/0019; B25D 2250/035; B25D 2250/065; B25D 2250/185; B25D 11/005; B25D 11/06; B25F 5/02; B25F 5/00; B29B 11/16; F16L 29/005; F16L 23/12; F16L 9/165; H02K 7/145; B21C 37/08

USPC ........................................................ 173/1, 90

See application file for complete search history.

(56) References Cited

U.S. PATENT DOCUMENTS 2,880,585 A 4/1959 Badcock
3,651,740 A * 3/1972 Perkins .................. B25C 1/041 227/130
3,771,710 A * 11/1973 Perkins .................. B25C 1/043 227/130
4,005,598 A * 2/1977 Ehmann ................ B21J 15/105 29/243.523

(Continued)

FOREIGN PATENT DOCUMENTS

CH 659 422 A5 1/1987
DE 212 744 A 8/1908

(Continued)

OTHER PUBLICATIONS

European Search Report dated Aug. 16, 2013 with Statement of Relevancy (Six (6) pages).
German Search Report, dated Jan. 16, 2013, 5 pages.

*Primary Examiner* — Robert Long
(74) *Attorney, Agent, or Firm* — Crowell & Moring LLP

(57) ABSTRACT

A hand-held power tool is disclosed. The tool has a pneumatic striking mechanism. The striking mechanism includes a motor-driven exciter, a guide tube and a striker. A pneumatic spring configured inside the guide tube between the exciter and the striker is circumferentially sealed pressure-tight by an inner surface of the guide tube. The exciter and/or the striker are configured as a piston guided by the inner surface. An inner surface of the guide tube is provided with a plurality of molded depressions.

16 Claims, 3 Drawing Sheets

(56) References Cited

U.S. PATENT DOCUMENTS

| | | | | | |
|---|---|---|---|---|---|
| 4,221,157 | A * | 9/1980 | Schmidt | E21B 4/145 | 173/135 |
| 4,250,972 | A * | 2/1981 | Schmidt | E21B 21/10 | 173/91 |
| 4,327,807 | A * | 5/1982 | Emonet | B25D 9/16 | 173/162.1 |
| 4,353,425 | A * | 10/1982 | Simpson | B25D 17/00 | 173/109 |
| 4,403,609 | A * | 9/1983 | Cohen | A61M 5/30 | 604/245 |
| 4,615,543 | A * | 10/1986 | Cannon | F16L 35/00 | 166/241.4 |
| 4,793,054 | A * | 12/1988 | Abbratozzato | H02K 1/17 | 29/596 |
| 5,135,152 | A * | 8/1992 | Uno | B25C 1/005 | 227/116 |
| 5,467,831 | A * | 11/1995 | Spektor | E21B 4/14 | 166/301 |
| 5,794,717 | A * | 8/1998 | Briggs | B25D 9/12 | 173/128 |
| 5,996,848 | A * | 12/1999 | Sperry | B29B 7/7678 | 141/105 |
| 6,244,161 | B1 * | 6/2001 | Myers | C22C 38/12 | 92/224 |
| 6,522,042 | B1 * | 2/2003 | Du et al. | 310/154.03 | |
| 7,290,691 | B1 * | 11/2007 | Wen | B25C 1/041 | 227/130 |
| 7,413,563 | B2 * | 8/2008 | Corcoran | A61B 17/0057 | 604/523 |
| 8,366,559 | B2 * | 2/2013 | Papenfuss | A61B 17/1631 | 464/149 |
| 8,376,865 | B2 * | 2/2013 | Forster | A61F 2/2427 | 464/149 |
| 8,740,591 | B2 * | 6/2014 | Blythe | 417/555.1 | |
| 8,850,845 | B1 * | 10/2014 | Tucker | F04B 17/04 | 417/415 |
| 9,044,847 | B2 * | 6/2015 | Kohlschmied | B25D 11/005 | |
| 2004/0007261 | A1 * | 1/2004 | Cornwell | F04B 49/035 | 137/115.16 |
| 2004/0177981 | A1 * | 9/2004 | Berger | B25D 11/005 | 173/201 |
| 2004/0222001 | A1 * | 11/2004 | Ikuta | B25D 11/125 | 173/210 |
| 2006/0076154 | A1 * | 4/2006 | Aoki | 173/212 | |
| 2006/0156859 | A1 * | 7/2006 | Nemetz | B25D 16/00 | 74/606 R |
| 2007/0017222 | A1 * | 1/2007 | Tsubouchi | B60T 11/16 | 60/533 |
| 2008/0073096 | A1 | 3/2008 | Berger et al. | | |
| 2008/0283264 | A1 * | 11/2008 | Ikuta | B25D 11/125 | 173/211 |
| 2008/0308287 | A1 * | 12/2008 | Sugiyama | B25D 11/125 | 173/211 |
| 2009/0283285 | A1 * | 11/2009 | Randa | E21B 7/26 | 173/212 |
| 2010/0024611 | A1 * | 2/2010 | Starick | B25B 23/145 | 81/470 |
| 2010/0155096 | A1 * | 6/2010 | Morrison | B25D 9/12 | 173/206 |
| 2010/0251692 | A1 * | 10/2010 | Kinde, Sr. | F02K 5/026 | 60/226.1 |
| 2010/0300718 | A1 * | 12/2010 | Hartmann et al. | 173/201 | |
| 2011/0125179 | A1 * | 5/2011 | Dell'Aquila | A61M 37/0076 | 606/186 |
| 2011/0290850 | A1 * | 12/2011 | Wu | B25C 1/04 | 227/130 |

FOREIGN PATENT DOCUMENTS

| | | | |
|---|---|---|---|
| DE | 199 29 183 | A1 | 1/2001 |
| DE | 103 33 799 | B3 | 2/2005 |
| DE | 10 2006 027 046 | B3 | 11/2007 |
| EP | 1 674 205 | A1 | 6/2006 |
| EP | 2 514 569 | A1 | 10/2012 |
| FR | 1 485 579 | A | 6/1967 |

* cited by examiner

CHISELING POWER TOOL

This application claims the priority of German Patent Document No. DE 10 2012 208 986.1, filed May 29, 2012, the disclosure of which is expressly incorporated by reference herein.

BACKGROUND AND SUMMARY OF THE INVENTION

The present invention relates to a chiseling, e.g., only chiseling or lathing, power tool having a pneumatic striking mechanism. In the case of a motor-driven pneumatic striking mechanism, an impacting piston is accelerated periodically in a guide tube by a pneumatic spring and strikes a point of impact on a tool or an intermediate striker. The principle of the pneumatic spring requires an airtight guidance of the impacting piston in the guide tube. Due to the high mechanical stress from repercussions or thermo-mechanical stress, the striking mechanism is heated to over 100 degrees Celsius. Furthermore, the impacting piston must move smoothly in the guide tube so it does not suppress the relatively weak coupling of the motive drive via the pneumatic spring.

The hand-held power tool according to the invention has a pneumatic striking mechanism. The striking mechanism contains a motor-driven exciter, a guide tube and a striker. A pneumatic tube configured inside the guide tube between the exciter and the striker is circumferentially sealed pressure-tight by an inner surface of the guide tube. The exciter and/or the striker are configured as a piston guided by the inner surface. For example, the exciter and striker may be configured as pistons, the exciter as a piston and the striker connected rigidly in a pot-shaped manner to the guide tube, or the striker as a piston and the exciter connected rigidly to the guide tube. An inner surface of the guide tube is provided with a plurality of molded depressions.

The shape of the inner surface is adapted to the outer contour of the piston so that the piston is cleanly guided and sealed pressure-tight. A slight deviation using depressions proves to be advantageous with regard to friction without impairing guidance or the pressure-tight seal that is essential for the concept of the pneumatic striking mechanism in particular.

One embodiment provides that the depressions have a depth between 10 μm and 100 μm. Smaller depressions show no effect; it is presumed that the lubricating film counterbalances these depressions. Larger depressions increase the abrasion of the sealing elements and therefore reduce the service life. One dimension of the depression parallel to the working axis is preferably less than 200 μm. The depressions have a surface area between 1% and 10% of the inner surface.

An inner surface of the guide tube may be provided with a plurality of grooves running oblique to the working axis and/or circular, square or diamond-shaped dents. The grooves have a length that is greater than the width by at least one order of magnitude. The dents are approximately as long as they are wide. An inner surface of the guide tube is provided with a plurality of grooves running obliquely to the working axis.

The grooves running obliquely reduce the frictional force without, as it was initially feared, considerably impairing a seal of the pneumatic chamber for the pneumatic spring. The efficiency of the striking mechanism was able to be increased overall, i.e., it was possible to increase the ratio of the impact energy emitted by the striker on the tool to the energy supplied by the motor via the exciter.

One embodiment provides that the grooves cross each other in a diamond shape. One group of grooves has a different circumferential direction around the working axis than the grooves of another group.

An angle of inclination of the grooves with respect to the working axis is preferably in a range between 30 degrees and 50 degrees. This is the case especially if the inclination of the grooves is constant over the entire length thereof. In the case of one embodiment it is provided that the angle of inclination decreases along an impact direction. The angle of inclination in the region of the point of impact is 20 degrees to 40 degrees.

The grooves extend advantageously over at least the path covered by the striker during percussive operation.

One embodiment provides that grooves of a group having a common direction of rotation run parallel to one another.

One embodiment provides that the guide tube be bent from a sheet-metal strip. Sheet-metal strips are produced by rolling methods. In doing so, the surface typically becomes very smooth and even. An embossing or scoring of the grooves proves to be especially advantageous for guide tubes formed from sheet metal. The sheet-metal strip may be connected at the two opposing edges thereof by a continuous form-fit or a seam in order to form a pressure-tight tube. The pressure-tight form-fit is guaranteed by an intermeshing.

The following description explains the invention on the basis of exemplary embodiments and Figures.

DETAILED DESCRIPTION OF THE DRAWINGS

Unless otherwise indicated, the same or functionally equivalent elements are identified by the same reference numbers in the Figures.

Figure 1:
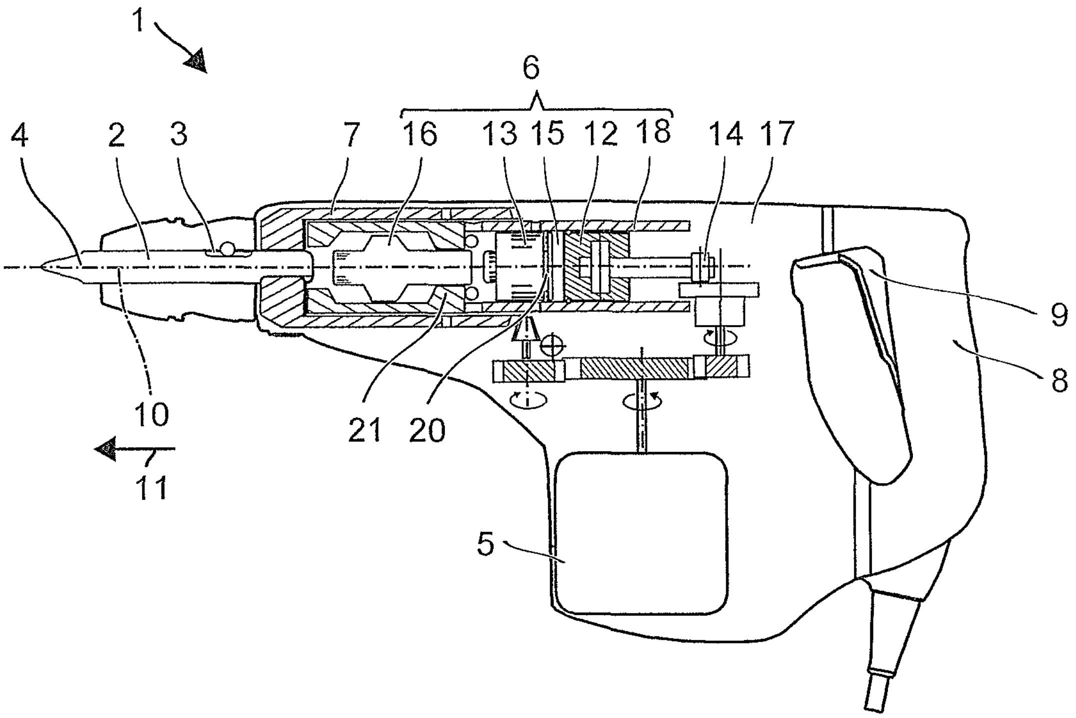
FIG. 1 illustrates a hammer drill.

FIG. 1 schematically shows a hammer drill 1 as an example of a chiseling hand-held power tool. The hammer drill 1 has a tool receptacle 2 into which a shaft end 3 of a tool 4, e.g., the drill bit, may be inserted. A motor 5 forms a primary drive of the hammer drill 1, the motor driving a striking mechanism 6 and an output shaft 7. A user is able to guide the hammer drill 1 by a hand grip 8 and use a system switch 9 to put the hammer drill 1 into operation. During operation, the hammer drill 1 rotates the drill bit 4 continuously around a working axis 10 and in doing so is able to hammer the drill bit 4 in the impact direction 11 along the working axis 10 into a substrate.

The striking mechanism 6 is a pneumatic striking mechanism, for example. An exciter 12 and a striker 13 are guided moveably in the striking mechanism 6 along the working axis 10. The exciter 12 is coupled to the motor 5 via an eccentric 14 or a wobble finger and forced into a periodic, linear movement. A pneumatic spring formed by a pneumatic chamber 15 between the exciter 12 and striker 13 couples a movement of the exciter 12 to the striker 13. The striker 13 is able to directly strike a rear end of the drill bit 4 or indirectly transfer a portion of its impulse to the drill bit 4 via a substantially resting intermediate striker 16. The striking mechanism 6, and preferably the other drive components, are disposed inside a machine housing 17.

The exemplary exciter 12 is designed as a piston, which is moved back and forth in a cylindrical guide tube 18. The striker 13 is likewise designed as a piston. The radial outer surfaces of both the exciter 12 and the striker 13 seal airtight with an inner surface 19 of the guide tube 18. The striker 13 is provided with a sealing ring 20, which has typically proven to be necessary to achieve a pressure in the range between 10 bar and 20 bar because of the remaining manufacturing tolerances. The sealing ring 20 is preferably made of natural or synthetic rubber. The exciter 12 may be connected rigidly to the guide tube 18 in order to form a pot-shaped exciter 12, in which the striker 13 runs.

The guide tube 18 may extend up to a bearing block 21 for the intermediate striker 16. The guide tube 18 has a plurality of radial openings with respect to the working axis 10. The first of the openings 22 makes an adiabatic equalization of pressure of the pneumatic spring possible in the case of a device that is heating up. The second of the openings 23 vents the pneumatic chamber 15 and deactivates the pneumatic spring as soon as the striking mechanism 6 idles percussively.

Figure 3:
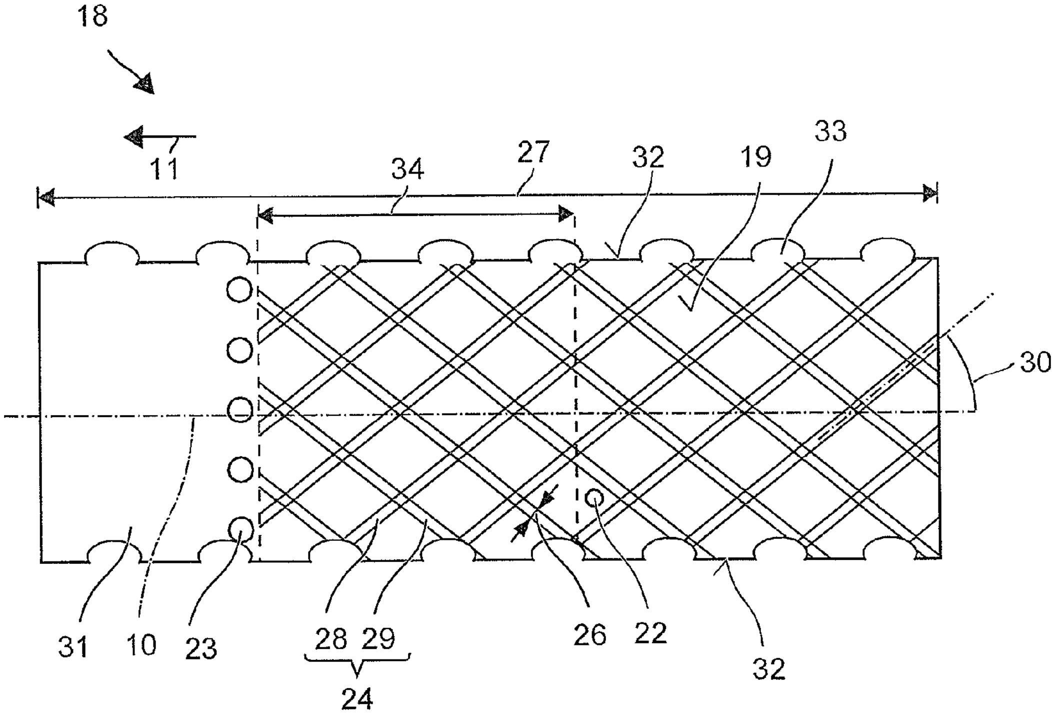
FIG. 3 illustrates an unrolled inner surface of the guide tube of FIG. 2.
Figure 2:
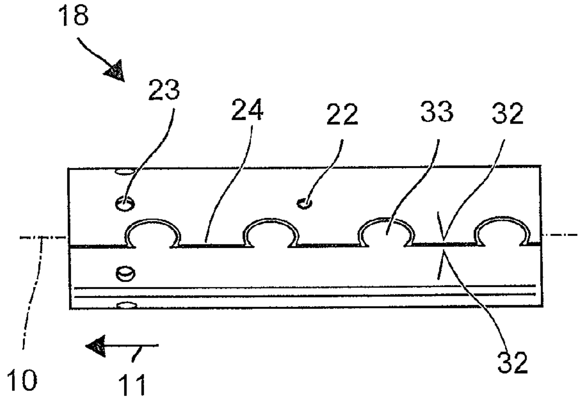
FIG. 2 illustrates an embodiment of a guide tube in accordance with the principles of the present invention.
Figure 4:
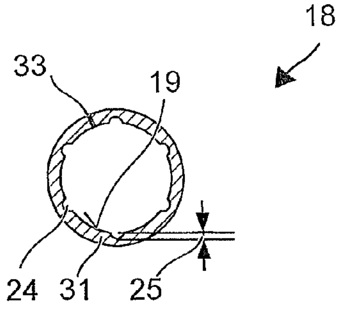
FIG. 4 is a cross-section through the guide tube of FIGS. 2 and 3.

The frictional losses of the exciter 12 on the inner surface 19 of the guide tube 18 are supposed to be absolutely minimal. An initial reduction in the friction is achieved by a lubricating film. A structured inner surface 19 also proves to be advantageous as compared to a smooth inner surface 19. The inner surface 19 is provided with grooves 24 running obliquely to the working axis 10. FIG. 3 depicts the unrolled inner surface 19 of the guide tube 18.

The grooves 24 have a depth 25 of greater than 10 μm (micrometer) and a depth 25 of less than 100 μm. A width 26 of the grooves 24 is in the range of the depth 25. For example, the grooves 24 are approximately one to five times as wide as they are deep. The depth 25 is the dimension of the groove 24 in the radial direction, the width 26 is the smallest dimension of the groove 24 on the inner surface 19 and the length is the largest dimension on the inner surface 19. The grooves 24 may extend over the entire length 27 of the guide tube 18.

The grooves 24 run helically along the inner surface 19. An inclination of the grooves 24 with respect to the working axis 10 remains preferably constant over the length thereof. A first group 28 of grooves 24 runs in a positive direction of rotation and a second group 29 of grooves 24 runs in a negative direction of rotation. The grooves 24 of the two groups 28, 29 mutually cross each other.

Adjacent grooves 24, of a group 28, 29, are disposed offset from one another at a distance of between 5,000 μm to 20,000 μm along the working axis 10. The inner surface 19 between the adjacent grooves 24 is preferably smooth. Smooth means that a roughness of the inner surface 19 between the grooves 24 is at least one order of magnitude less than the depth 25 of the grooves 24.

An amount of the angle of inclination 30 of the grooves 24 with respect to the working axis 10 is in a range between 30 degrees and 50 degrees. The relationship of the inclination in interplay with the striker 13, the sealing ring 20, the lubricating film and the periodically changing temperature and pressure conditions is not fully understood. However, both smaller and larger angles of inclination 30 that are outside of the range result in greater losses of the striking mechanism 6. The angle of inclination 30 of the helical grooves 24 is the difference of the pitch angle from 90 degrees.

The guide tube 18 is produced from a bent sheet-metal strip 31, which is closed by a seam and/or an intermeshing closure along the working axis 10 (FIG. 3). The opposing edges 32 of the sheet-metal strip 31 may be provided with a toothing, which interlocks in the case of the sheet-metal strip 31 that is bent into the guide tube 18. The toothing 33 may also be sealed airtight by a weld seam. Alternatively, the toothing may be sealed airtight with a plastic.

The grooves 24 are preferably rolled into the sheet-metal strip 31 or introduced using another non-cutting method. Therefore, the inner surface 19 remains free of burrs.

The guide tube 18 is longer than the path 34 of the striker 13 during operation. The striker 13 moves periodically between a point of impact and a rear reversal point. The point of impact is defined by the intermediate striker 16 and the front surface thereof facing the striker 13. The rear reversal point is provided by the pneumatic spring 15, which decelerates the striker 13 to a standstill and then accelerates in the direction of the point of impact. In the design with the piston-shaped exciter 12, the rear reversal point is approximately at the height at which the exciter 12 has covered half the way between its two turning points.

A first ventilation opening 22 for an adiabatic equalization of pressure is preferably punched into the sheet-metal strip 31. Furthermore, second ventilation openings 23 for stopping the striking mechanism 6 are preferably punched into the sheet-metal strip 31. The punch entry is on the inner surface 19. The ventilation openings 22, 23 are outside the path 34. The second ventilation openings 23 are preferably directly following the path 34.

In one embodiment, the grooves 24 end in the vicinity of the second ventilation openings 23, i.e., at a section of the guide tube 18 following the path 34 in the impact direction 11. An increased friction may encourage a stopping of the striker 13 when the striker 13 glides beyond the point of impact e.g., in the case of idle percussion.

A further embodiment provides for a variation of the angle of inclination 30 along the working axis 10. The angle of inclination 30 with respect to the working axis 10 decreases in the impact direction 11. Near the rear reversal point, the guide tube 18 must be airtight against the high air pressure in the pneumatic chamber 15. Grooves 24 that are as perpendicular as possible to the working axis 10 are preferred for this. This orientation of the grooves 24, however, indeed produces a greater frictional resistance than the grooves 24 parallel to the working axis 10. The angle of inclination 30 in the region of the rear reversal point is between 40 degrees and 60 degrees and decreases in the direction of the point of impact to between 20 degrees and 30 degrees.

One embodiment may have grooves 24 that are different depths. For example, every fifth to tenth groove 24 may have a depth 25 that is two to five times greater than the others. The fewer and deeper grooves 24 that have a depth 25 between 50 μm and 100 μm, for example, may accommodate dust particles, which pass through the seals and the intermediate striker 16. The number of deep grooves 24 is kept low in order guarantee a sufficiently pressure-tight seal of the striker 13 on the inner surface 19.

Figure 5:
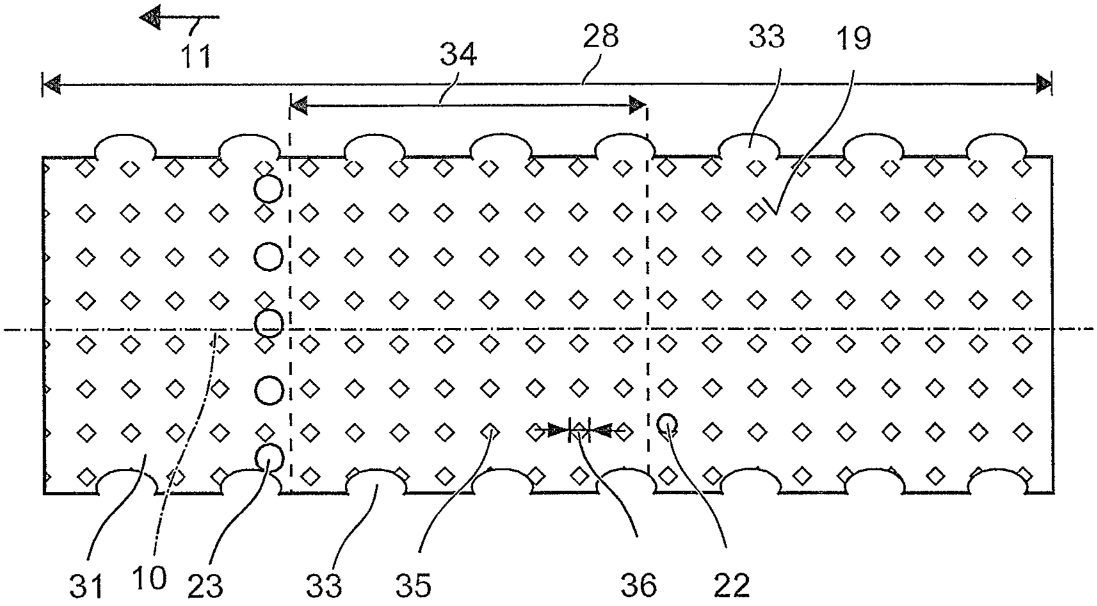
FIG. 5 illustrates an unrolled inner surface of an alternative embodiment of a guide tube in accordance with the principles of the present invention.
Figure 6:
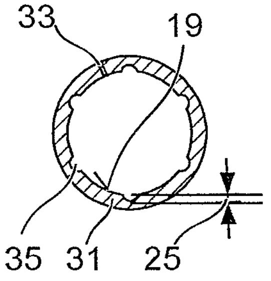
FIG. 6 is a cross-section through the guide tube of FIG. 6.

One embodiment has punctiform dents 35 (FIGS. 5 and 6) instead of or in addition to the grooves 24. The dents 35 have a depth 25 of between 10 μm and 100 μm. A diameter 36 of the dents 35 is approximately in the range of the depth 25 thereof. The dents 35 are preferably regularly disposed, e.g., at points of intersection of a grid having rectangular or diamond-shaped cells. The entire surface of the dents 35 is considerably smaller than the inner surface 19, e.g., less than 10%. The remaining inner surface 19 is preferably smooth, i.e., has a roughness of considerably less than 10 μm. The striker 13 touches the remaining smooth inner surface 19.

The dents 35 may be embossed in the inner surface 19 with a stamp, for example. The ridge from stamping may be leveled out by a subsequent rolling in or stamping.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-held power tool, comprising:

a pneumatic striking mechanism, including:

a motor-driven exciter, wherein the exciter is coupled to a motor via an eccentric or a wobble finger and wherein the exciter is forced into a periodic movement by the eccentric or the wobble finger;

a guide tube; and a striker;

wherein a pneumatic spring configured inside the guide tube between the exciter and the striker is circumferentially sealed pressure-tight by an inner surface of the guide tube;

wherein the exciter and the striker are guided by the inner surface;

wherein the inner surface of the guide tube has a plurality of molded depressions and wherein the guide tube has a plurality of vent openings.

2. The hand-held power tool according to claim 1, wherein the depressions have a depth of between 10 μm and 100 μm.

3. The hand-held power tool according to claim 1, wherein a dimension of the depressions parallel to a longitudinal axis is less than 200 μm.

4. The hand-held power tool according to claim 1, wherein the depressions occupy a surface area of between 1% and 10% of the inner surface.

5. The hand-held power tool according to claim 1, wherein the depressions are dents and wherein a respective length and width of the dents are substantially equal.

6. The hand-held power tool according to claim 1, wherein the depressions are a plurality of grooves running obliquely to a longitudinal axis.

7. The hand-held power tool according to claim 6, wherein grooves of the plurality of grooves cross each other in a diamond shape.

8. The hand-held power tool according to claim 6, wherein grooves of the plurality of grooves extend over at least a path covered by the striker during a percussive operation.

9. The hand-held power tool according to claim 6, wherein an angle of inclination of the plurality of grooves to the longitudinal axis is between 30 degrees and 50 degrees.

10. The hand-held power tool according to claim 6, wherein an angle of inclination of the plurality of grooves decreases along an impact direction and wherein the angle of inclination in a region of a point of impact is between 20 degrees and 40 degrees.

11. The hand-held power tool according to claim 1, wherein the guide tube is a bent sheet-metal strip.

12. The hand-held power tool according to claim 11, wherein two opposing edges of the guide tube are connected by an intermeshing form-fit.

13. A pneumatic striking mechanism of a hand-held power tool, comprising:

an exciter, wherein the exciter is coupled to a motor via an eccentric or a wobble finger and wherein the exciter is forced into a periodic movement by the eccentric or the wobble finger;

a striker; and a guide tube;

wherein the exciter and striker are disposed within the guide tube;

wherein an inner surface of the guide tube has a plurality of depressions and wherein the guide tube has a plurality of vent openings.

14. The pneumatic striking mechanism according to claim 13, wherein the depressions are grooves.

15. The pneumatic striking mechanism according to claim 13, wherein the depressions are dents.

16. A hand-held power tool, comprising:

a pneumatic striking mechanism, including:

a motor-driven exciter;

a guide tube with an inner surface;

a striker, wherein the striker strikes either directly or indirectly on a tool bit; and a pneumatic spring, wherein the pneumatic spring is formed by a pneumatic chamber between the exciter and the striker and wherein the pneumatic spring couples a movement of the exciter to the striker;

wherein the exciter and the striker are guided by the inner surface;

wherein the inner surface of the guide tube has a plurality of molded depressions and wherein the guide tube has a plurality of vent openings.

* * * * *